July 18, 1967  J. E. A. BLANCHET  3,331,172
MOLDING ASSEMBLY
Filed March 25, 1965  2 Sheets-Sheet 1
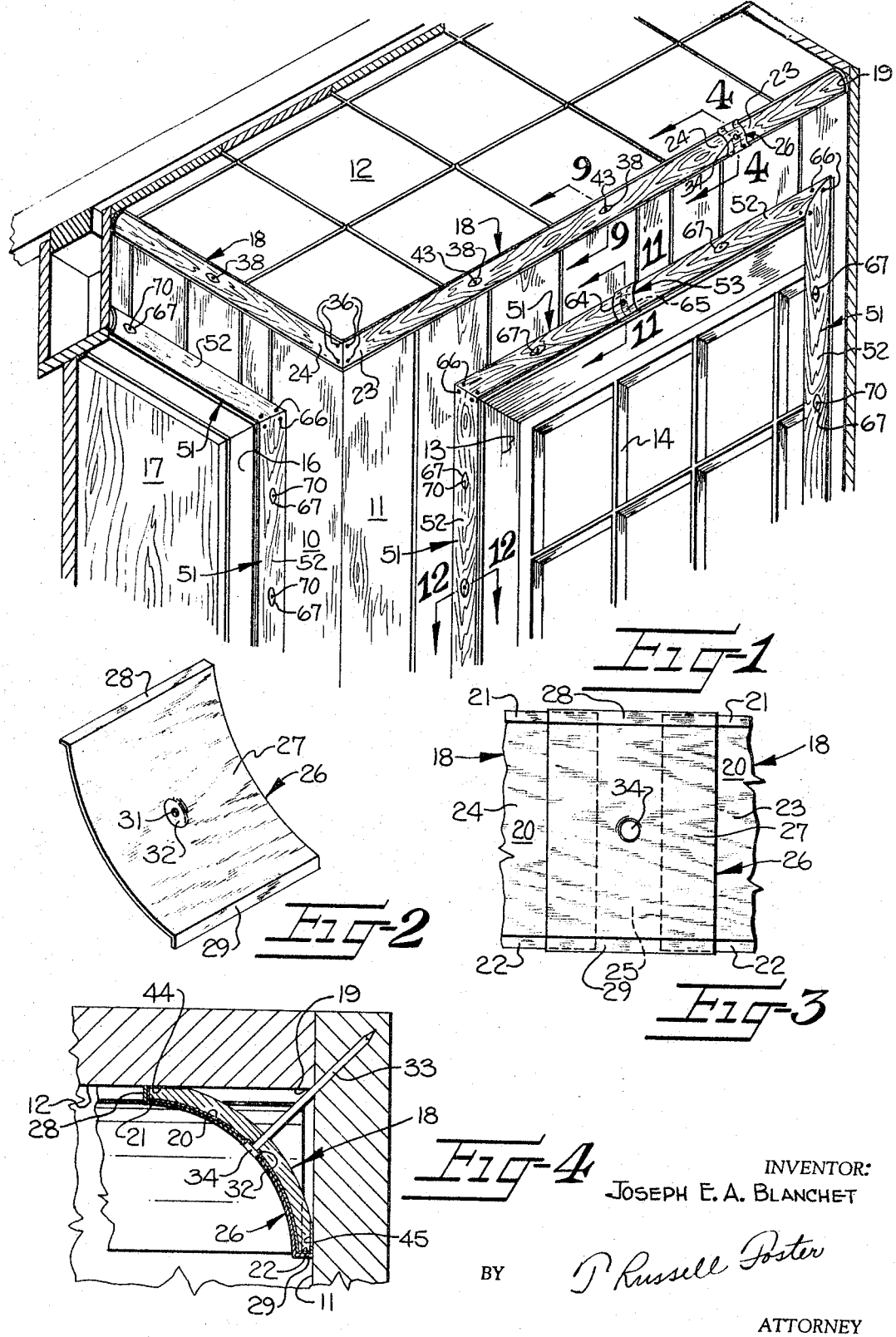
INVENTOR:
JOSEPH E. A. BLANCHET
BY T. Russell Foster
ATTORNEY July 18, 1967  J. E. A. BLANCHET  3,331,172
MOLDING ASSEMBLY Filed March 25, 1965  2 Sheets-Sheet 2

INVENTOR:
JOSEPH E. A. BLANCHET
BY Russell Foster
ATTORNEY

United States Patent Office 3,331,172
Patented July 18, 1967

3,331,172
MOLDING ASSEMBLY
Joseph E. A. Blanchet, Mystic, Conn., assignor to Sonoco Products Company, Darlington, S.C., a corporation of South Carolina
Filed Mar. 25, 1965, Ser. No. 445,842
6 Claims. (Cl. 52—288)

ABSTRACT OF THE DISCLOSURE

This invention comprises an arrangement for supporting a plurality of molding strips in room corners, etc. The molding strips are arranged in end-to-end relationship in a longitudinally aligned row with the adjacent ends defining a clearance space. The supporting arrangement includes a clip which overlies the outer surfaces of the molding strips at their adjacent ends to support the molding strips in longitudinally sliding movement relationship therewith thereby permitting the strips to expand and contract freely. The clip is secured to the wall underlying room by mounting means such as a nail extending within the clearance space. Each molding strip is also provided with one or more slots intermediate its ends for accommodating mounting means, such as a nail also secured to the underlying wall, for a retainer plate also overlying the outer surface of the strip. The retainer plate and its mounting means thus support the molding strip intermediate its ends while permitting the molding to expand and contract freely as the strip slot moves relative to the nail.

---

This invention relates to molding of the type used in building construction and more particularly to an arrangement for mounting such molding composed of fibrous material in room interiors and the like.

As an inexpensive substitute for decorative molding composed of wood and the like commonly employed in the corners of rooms in residential dwellings, around door frames and the like, it has been proposed to fabricate such molding from fibrous material such as paper. The manufacture of such paper molding can be accomplished in many ways such as by adhesively securing together plies of paper to form elongated multi-ply molding strips of the desired cross-sectional shape. Another technique for forming such molding involves spirally winding a plurality of paper plies into the form of a spiral tube with the plies adhesively secured together and subsequently slitting this spiral tube longitudinally into a plurality of elongated molding strips each having an arcuate cross-sectional shape.

Previously, such paper molding strips have been mounted in the desired position by means of nails or the like driven directly through the strips whereby the strips are fixedly secured to a wall member and serve to attractively conceal corners or form a decorative border around door frames, window frames and the like.

It has been found in practice, however, that the moisture content of such paper molding closely follows the ambient humidity conditions at the place of use and, therefore, seasonal fluctuations in humidity produce a wide range in the moisture content of the molding. In accordance with the well known characteristics of paper, this fluctuation in moisture content produces a substantial dimensional change in the molding as the molding expands and contracts in direct proportion to the moisture content. It can be readily understood that when such molding is mounted on a wall by means such as nails or the like driven through the molding, the dimensional changes in the molding produce tearing, warping and other destructive and unattractively appearing effects in the molding.

Accordingly, a primary object of this invention is to provide a new and novel molding assembly for use in building construction such as room interiors and the like.

Another object of this invention is to provide a new and novel molding assembly utilizing molding strips formed of laminated paper plies which permit the molding strips to expand and contract under changing humidity conditions without noticeably affecting the structure and the outward appearance of the molding.

Another object of this invention is to provide a new and novel arrangement for mounting paper molding strips on a wall member which permits the molding strips to expand and contract freely without damage and which may be adapted to support molding having any desired cross-sectional shape.

Still another object of this invention is to provide a new and novel molding assembly utilizing paper molding which permits the paper molding to be mounted in an attractive manner with mounting devices blending attractively with the outwardly facing molding surfaces and which may be installed in a simple and easy manner with a minimum of mounting devices.

Other objects and advantages of the invention will become apparent from the following description taken in connection with the accompanying drawings.

In general, the objects of the invention and related objects are accomplished by the provision of a plurality of molding strips of arcuate cross-sectional shape which are formed of fibrous material such as paper. These strips are arranged to be mounted on a wall member such as in the corner of a room between a wall and ceiling, around door and window frames or the like in longitudinally aligned rows with adjacent ends of the strips in each row in spaced apart relationship defining a clearance space. Clip means are provided for supporting the adjacent ends of the strips in a row for limited unrestrained sliding movement of the strips relative to the clip means as the strips expand and contract with changing humidity conditions. One or more longitudinally extending slots, suitably spaced, are preferably provided in each of the strips intermediate their ends. Strip retaining means having portions extending through the slot are provided so that the strip is supported and permitted to expand and contract freely as the slot shifts relative to the strip retaining means portions.

The novel features which are believed to be characteristic of the invention are set forth with particularity in the appended claims. The invention, itself, however, both as to its organization and method of operation may be best understood by reference to the following description taken in conjunction with the accompanying drawings in which:

FIGURE 1 is an isometric view of a portion of a room having two forms of the molding of the invention positioned in suitable locations;

FIGURE 2 is an isometric view of one form of a molding mounting clip of the invention;

FIGURE 3 is an enlarged plan view of a portion of the molding of FIGURE 1 illustrating the molding mounting clip of FIGURE 2;

FIGURE 4 is an enlarged sectional view taken substantially along line 4—4 of FIGURE 1 in the direction of the arrows;

Figure 5:
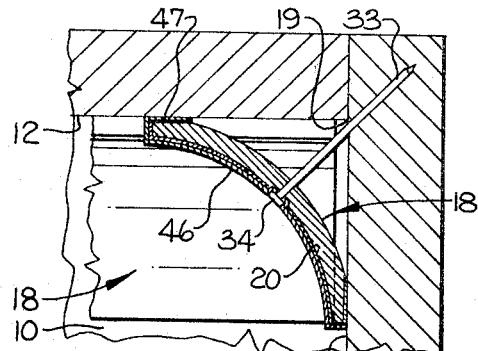
FIGURE 5 is a view similar to FIGURE 4 illustrating another form of the molding mounting clip of the invention.

Referring now to the drawings and to FIGURE 1 in particular, there is shown a portion of an enclosure such as a room in a residential dwelling in which the molding of the invention is installed. In general, the room shown in FIGURE 1 comprises adjacent walls 10, 11 and a ceiling 12. Wall 11 is provided with a window opening 13 for accommodating a window 14 of conventional construction. Wall 10 is provided with a door opening 16 for accommodating a door 17 of conventional construction.

As generally illustrative of the invention, the molding assembly of the invention is constructed in two forms, one form being referred to hereinafter as "cove" molding. The cove molding comprises elongated strips of fibrous material designated generally in FIGURE 1 by the numeral 18 arranged in a longitudinally aligned row. The cove molding strips 18 are of the type suitable for mounting in the corner 19 between the walls 10, 11 and the ceiling 12 and have an arcuate cross-sectional shape to provide a concave outwardly facing surface.

Preferably this concave outwardly facing surface on the cove molding is covered with a paper sheet 20 of a suitable color and design so that the molding presents an attractive, decorative surface to the viewer. The paper sheet 20, shown clearly in FIGURE 4, may be secured to the surface of molding strip 18 by any suitable means such as an adhesive or the like.

The other illustrated form of the molding of the invention also shown in FIGURE 1 is referred to hereinafter as "trim" molding and comprises elongated strips designated generally by the numeral 51. The trim molding strips 51 are located in longitudinally aligned rows as shown around the edges of the window frame 13 and door frame 16 in walls 11, 10 respectively. The trim molding strips 51 are also arcuately shaped in cross-section, but are the reverse of the cove molding strips to provide a convex outwardly facing surface covered with a decorative paper sheet 52.

As has been referred to above, both the cove molding strips 18 and the trim molding strips 51 are formed from fibrous material and are preferably of a laminated paper ply construction. As a result of the moisture content of the fibrous material or paper plies following closely ambient humidity conditions, substantial dimensional changes occur in the length of the molding strips as the strips expand and contract with changes in moisture content.

In the molding assembly of the invention, means are provided for mounting the molding strips 18, 51 so that the strips may expand and contract freely without interference. As specifically illustrative of the molding mounting arrangement of the invention, the cove molding strips 18 contain longitudinally extending upper and lower side edges 21, 22 and terminal end portions 23, 24. The strips 18 are mounted as shown best in FIGURE 3 with the adjacent end portions 23, 24 of two adjacent strips in a spaced apart relationship to define a clearance space 25. The clearance space 25 is preferably not less than one half inch in width to provide for changes in the length of the strips 18 under varying humidity conditions as will be explained hereinafter.

Clip means are provided for supporting the adjacent end portions 23, 24 of the strips 18 on a wall member such as in the corner 19 between the walls 10, 11 and ceiling 12 which in the specific embodiment illustrated include a clip designated generally by the numeral 26 as shown best in FIGURE 2. The clip 26 used with the cove molding strip 18 includes an arcuate portion 27 which conforms substantially to the concave outwardly facing surface of the strip 18 and is arranged to be positioned in overlying relationship therewith and with the decorative paper sheet 20. The arcuate portion 27 of the clip terminates at each end in flanges 28, 29 which are arranged to overlap the corresponding side edges 21, 22 respectively of the strips 18. Preferably, the front surface of clip 26 is decorated similarly to the surface of the paper sheet 20 so as to blend attractively therewith.

Means are provided for fastening the clip 26 to the wall member or corner 19 underlying the molding for supporting the adjacent ends 23, 24 of the molding strips. More specifically, the clip arcuate portion 27 is provided with a suitably formed central opening 31 surrounded by a recess 32. As shown best in FIGURE 4, a nail 33 having a head 34 is inserted through the clip opening 31 and through the clearance space 25 into the wall material of the corner 19. As will be noted, the nail head 34 seats within the recess 32 so that the nail head lies flush with the surface of the clip portion 27. In this manner, the clip 26 supports the end portions 23, 24 of the adjacent strips 18 and permits expansion and contraction of the strips 18 without interference as a result of the unrestrained sliding movement of the strips relative to the clip.

The end portions 23, 24 at the ends of a row of strips 18 are fixedly secured to the material forming the corner 19 by means of one or more nails 36. Thus, all of the strips 18 may freely expand and contract within the clearance spaces 25 without interference from the clip mounting nail 33 as securing the terminal ends of a row of strips to the wall member does not interfere with the movements of the strips.

Figure 7:
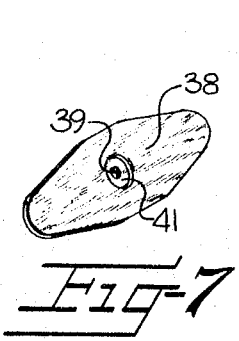
FIGURE 7 is an isometric view of the molding retainer plate of the invention.
Figure 8:
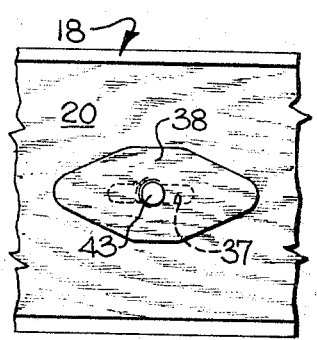
FIGURE 8 is an enlarged plan view of another portion of the molding of FIGURE 1 including the retainer plate of FIGURE 7.
Figure 9:
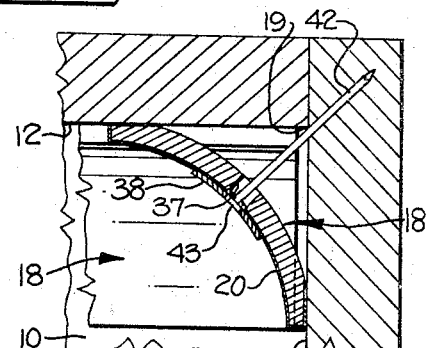
FIGURE 9 is an enlarged sectional view taken substantially along line 9—9 of FIGURE 1 in the direction of the arrows.

In order to prevent any sagging of the strips 18 as well as to eliminate warping which might occur under varying humidity conditions, strip retaining means are provided intermediate the ends of each of the strips 18. As shown best in FIGURES 7 through 9, each of the strips 18 is provided with at least one longitudinally extending slot 37 preferably centrally arranged between the strip edges 21, 22. A retainer plate 38 is provided as shown in FIGURE 7 having an arcuate cross-sectional shape conforming to the concave outer surface of the strip and a central opening 39 surrounded by a recess 41 is suitably formed in the plate.

The plate 38 is positioned on the outwardly facing surface of the strip in contact with the decorative paper sheet 20 over the slot 37. A nail 42 having a head 43 is then inserted through the plate opening 39 and the strip slot 37 into the underlying material of the corner 19 with the nail head seated in the plate recess 41 so that the nail head lies flush with the outer surface of the retainer plate 38. As a result of the slot 37 in the strips 18, the strips may expand and contract freely without damage as the slot moves relative to the nail 42 while at the same time the strips are supported by the retaining plate 38. Preferably, the edges of the plates 38 are serrated to enhance the blending of the plate surface with the decorative paper sheet 20 on the strips. It has been found in practice that by locating a retainer plate 38 every two feet along the length of the strips 18, highly satisfactory support for the molding is obtained.

It will be noted in the drawings that the strips 18 are preferably provided with flats 44, 45 adjacent each of the side edges 21, 22 to permit the strips to seat properly against the surfaces of the walls 10, 11 and the ceiling 12 and the paper sheet 20 preferably extends around the strip edges over the flats. The flats may be formed in any suitable manner such as by grinding or the like and when the strips 18 are formed from a spiral tube, the tube may be ground along circumferentially spaced longitudinally extending portions through the center of which the tube is split to produce the strips 18.

Figure 6:
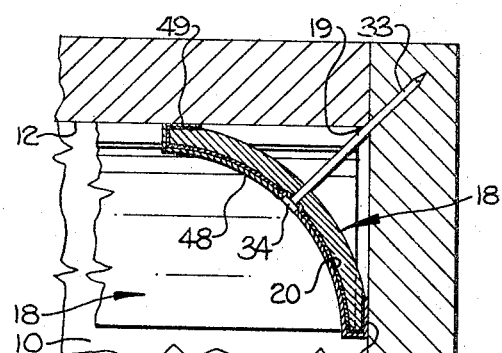
FIGURE 6 is another view similar to FIGURE 4 illustrating still another form of this molding mounting clip.

FIGURES 5, 6 are both sectional views similar to FIGURE 4 showing modified form of the cove molding clip of FIGURE 2. In FIGURE 5, a clip 46 is provided having its lower end flange similar to the end flange 29 of clip 26 but the clip is provided with a channel shaped upper end flange 47 for receiving the upper strip edge 21. In FIGURE 6 a clip 48 is provided having channel shaped end flanges 49, 50 which receive the longitudinally extending side edges 21, 22 respectively of the cove molding strip 18.

The other form of the molding provided by this invention which is referred to as trim molding is used primarily as a border around the edges of door frames, window frames and the like as shown in FIGURE 1. As has been referred to, the trim molding strips 51 present a convex outwardly facing surface which is preferably covered with a decorative paper sheet 52 having a selected color and design.

Figure 10:
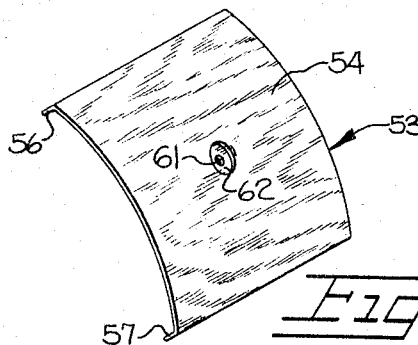
FIGURE 10 is a view similar to FIGURE 2 illustrating another form of the molding mounting clip of the invention.

The mounting arrangement for the trim molding strips 51 is generally the same as that for the cove molding strips 18 as the strips are arranged in longitudinally aligned rows with adjacent ends supported by clips designated generally by the numeral 53 as shown in FIGURES 10. The clip 53 includes an arcuate portion 54 having edge flanges 56, 57. The clip 53 is mounted with its arcuate portion 54 in overlying relationship with the convex outwardly facing surface of the strips 51 and the sheet 52 thereon with the clip flanges 56, 57 in engagement with side edges 58, 59 respectively on the strips. The outer surface of the clips 53 is preferably of the same color and design of the underlying paper sheet 52 so as to blend harmoniously therewith.

A central opening 61 provided in the clip arcuate portion 54 and surrounded by a recess 62 receives a nail 63 having a head 64. The nail 63 passes through the clearance space 65 (FIGURE 1) between the adjacent ends of the molding strips and into the underlying wall member such as the wall 11 when the clip is mounted. The nail head 64 seats within the recess 62 as shown so as to lie flush with the outer surface of the clip portion 54.

The terminal ends of each row of trim molding strips 51 are secured to the marginal portions of the walls 10, 11 adjacent the door frame 16 or window frame 13 by means such as nails 66 and abutting corners of the vertical and horizontally extending molding strips are suitably coped to provide a heat junction.

Figure 11:
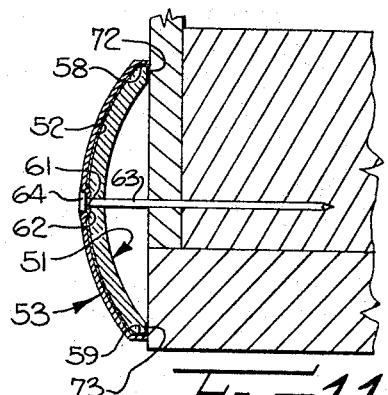
FIGURE 11 is an enlarged sectional view taken substantially along line 11—11 of FIGURE 1 in the direction of the arrows.
Figure 12:
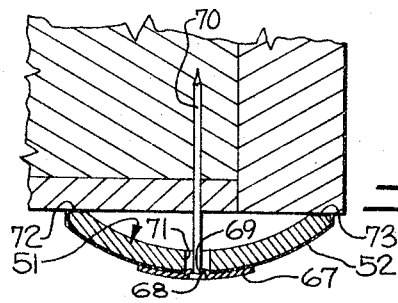
FIGURE 12 is an enlarged sectional view taken substantially along line 12—12 of FIGURE 1 in the direction of the arrows.

Retainer plates 67 are also provided for the trim molding strips 51 as shown in FIGURE 12 which are constructed similarly to the plate 38 of FIGURE 7 used with the cove molding with the exception that the arcuate cross-sectional shape of the plate 67 is reversed to conform to the convex outer surface of the trim molding. Plate 67 is provided with a recess 68 having a central opening 69 for accommodating a nail 70 extending through a slot 71 in the strip 51 and into the underlying wall member such as walls 10, 11. It will be noted in FIGURES 11, 12 that flats 72, 73 are provided on the trim molding strips 51 adjacent the strip edges 58, 59 for engagement with the wall surfaces on which the strips are mounted.

It can be seen that with the novel arrangement of the invention, an inexpensive, easily fabricated molding composed of fibrous material such as paper can be utilized as a readily acceptable substitute for the more expensive forms of molding with virtually no loss of aesthetic effect or functional result. The strip mounting arrangements provided by the invention are simple to install, utilize relatively inexpensive, readily available material and are appropriately decorated so as to be virtually unnoticeable by the viewer.

An outstanding feature of the invention is the arrangement by which the paper molding is permitted to contract and expand with changing humidity conditions so that once the molding is properly installed, no concern need be had for gaps between the molding and the walls and ceilings or for warping, tearing and other destructive and unattractive effects such as occur when such molding strips are secured to a wall member by nailing or the like.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A molding assembly comprising, in combination, a plurality of elongated molding strips formed of fibrous material, said molding strips arranged to be mounted on a wall member in a longitudinally aligned row with adjacent ends in spaced apart relationship to define a clearance space, clip means for supporting the adjacent ends of said strip for limited sliding movement relative to said clip means and for permitting said strips to expand and contract with changing humidity conditions throughout substantially their entire length, means for securing said clip means to said wall member, means for supporting the terminal ends of said row of strips on said wall member, at least one longitudinally extending slot in each of said molding strips intermediate its ends, strip retaining means positioned on said strip in overlying relationship with said slot, and means extending through said slot for securing said strip retaining means to said wall member and for permitting shifting of said slot relative thereto during said limited sliding movement of said strips.

2. A molding assembly in accordance with claim 1 wherein said molding strips are of arcuate cross-sectional shape.

3. A molding assembly in accordance with claim 2 wherein said clip means include an arcuate portion overlying the outwardly facing surface of said strips and a flange on the upper and lower ends of said arcuate portion engageable with the longitudinally extending side edges of said strips for guidably retaining said strips in said clip means.

4. A molding assembly in accordance with claim 2 wherein the arcuate cross-sectional shape of said strips forms a concave forward surface.

5. A molding assembly in accordance with claim 2 wherein the arcuate cross-sectional shape of said strips forms a convex forward surface.

6. A molding assembly comprising, in combination, a plurality of molding strips of arcuate cross-sectional shape and including a plurality of laminated paper plies adhesively secured together, said molding strips arranged to be mounted on a wall member in a longitudinally aligned row with adjacent ends in spaced apart relationship to define a clearance space, means for fixably securing the terminal ends of said row of molding strips to said wall member, a clip for supporting the adjacent ends of said strips for limited sliding movement of said strips relative to said clip and for permitting said strips to expand and contract throughout substantially their entire length with changing humidity conditions, said clip having an arcuate portion overlying the outwardly facing surface of said strips and a flange on the upper and lower ends of said arcuate portion engageable with the longitudinally extending edges of said strips for guidably supporting said strips, a nail extending centrally through said clip and centrally through said clearance space for securing said clip to said wall member, at least one longitudinally extending slot in each of said molding strips intermediate its ends, a retainer plate positioned on said strip in overlying relationship with said slot, a nail extending through said slot for securing said retainer plate to said wall member and permitting shifting of said slot relative thereto during said limited sliding movement of said strips.

References Cited

UNITED STATES PATENTS

| | | | |
|---|---|---|---|
| 388,286 | 8/1888 | Kinnear | 52—287 |
| 424,312 | 3/1890 | Kinnear | 52—288 |
| 623,681 | 4/1899 | Mooney | 52—467 |
| 3,060,638 | 10/1962 | Bender | 52—11 |
| 3,216,875 | 11/1965 | Wenthe | 52—716 |

JOHN E. MURTAGH, *Primary Examiner.*